United States Patent [19]

Kirby et al.

[11] 4,399,093
[45] Aug. 16, 1983

[54] INJECTION MOLDING METHOD AND EQUIPMENT

[75] Inventors: David B. Kirby, Lincoln Township, Berrien County, Mich.; Otfried W. G. Heybey, Springettsbury Township, York County, Pa.

[73] Assignee: Whirlpool Corporation, Benton Harbor, Mich.

[21] Appl. No.: 277,822

[22] Filed: Jun. 26, 1981

[51] Int. Cl.³ .............................................. B29F 1/08
[52] U.S. Cl. .......................... 264/328.2; 264/328.12; 264/328.16
[58] Field of Search ............ 264/328.12, 328.2, 328.16

[56] References Cited
U.S. PATENT DOCUMENTS 2,199,144  4/1940  Tegarty ..................... 264/328.12 X

*Primary Examiner*—Thomas P. Pavelko
*Attorney, Agent, or Firm*—Wood, Dalton, Phillips, Mason & Rowe

[57] ABSTRACT

A method of molding an element from liquid synthetic resin wherein liquid resin is introduced into a mold cavity through a first gate and liquid resin is concurrently introduced into the mold cavity through a second gate with portions of the resin received through each of the gates meeting at a joint interface. The resin in the second gate is caused to solidify sooner than the resin in the first gate so that the leading surface of the resin received through the first gate projects into a leading surface portion of the resin received through the second gate during the mold packing operation to provide an enlarged weld line area and improved strength in the joint. Apparatus for carrying out this method includes structure for causing the temperature in the gate of one of the resin streams to be different from that of the temperature in the gate of the other of the resin streams as a result of preselected characteristics of the respective gates through which the resin streams are passed. In an illustrated embodiment, a first gate passage may have a different cross-sectional configuration than that of a second gate passage so that the resin in the first gate may be cooled or heated to a different degree than the resin in the second gate, through differences in the heat transfer characteristics of the walls defining the respective passages. Alternatively, the first and second gate structure materials may have different thermal diffusivities. Further alternatively, the flow through the first gate may be terminated prior to the termination of flow through the second gate. In an illustrated embodiment, the invention is employed in an injection molding apparatus having more than two gate structures.

9 Claims, 8 Drawing Figures

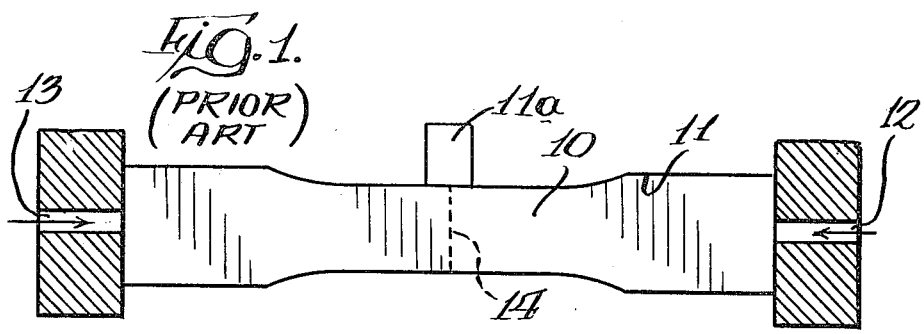
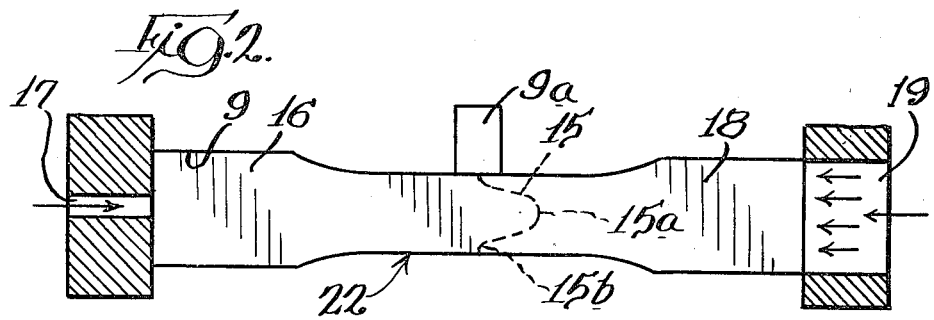
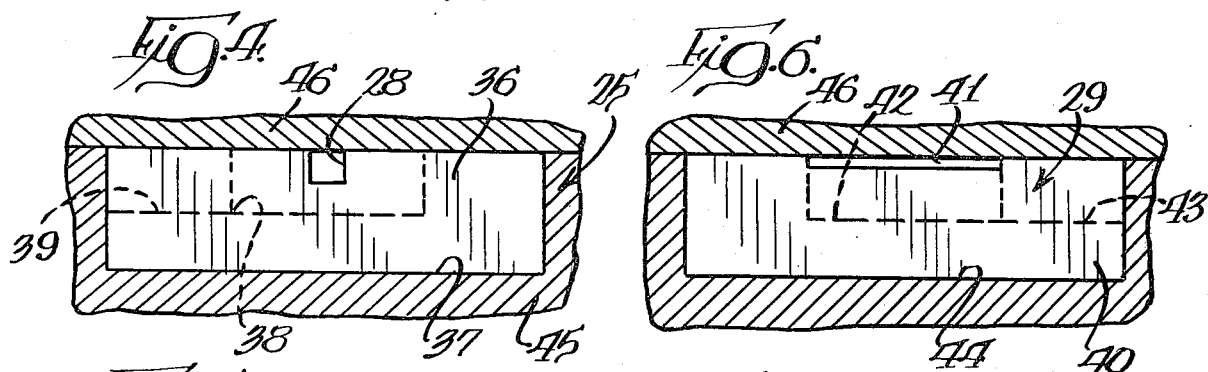
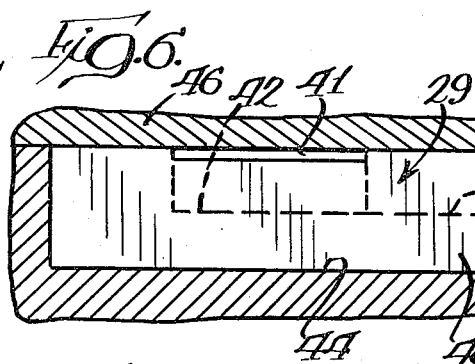
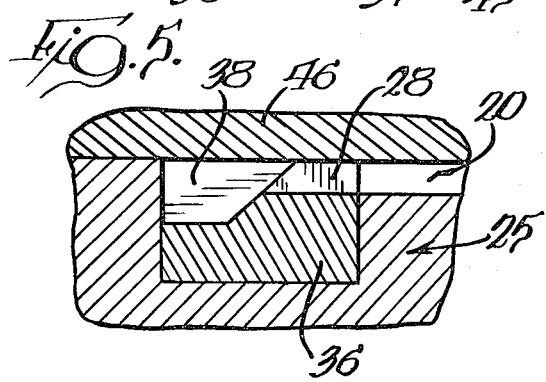
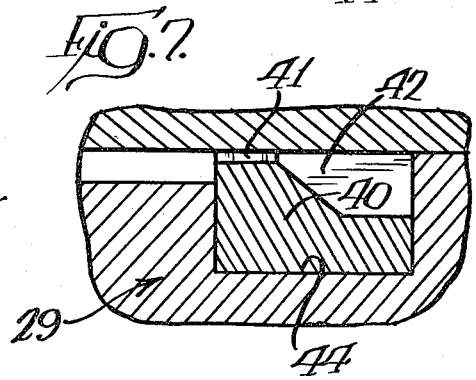
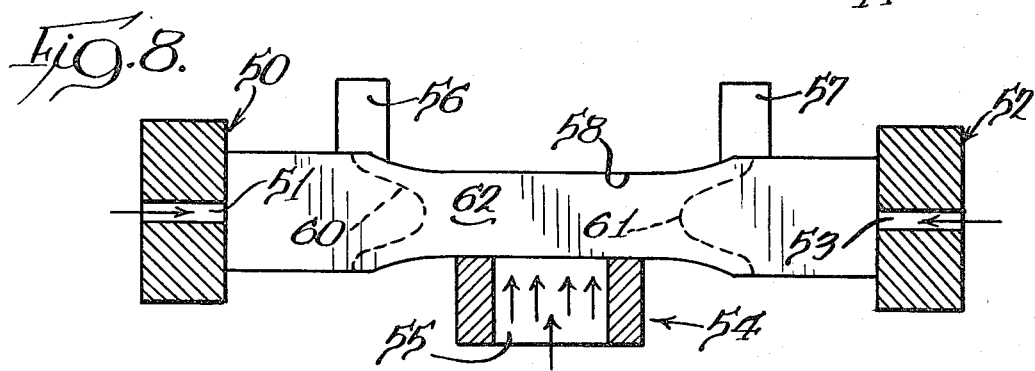

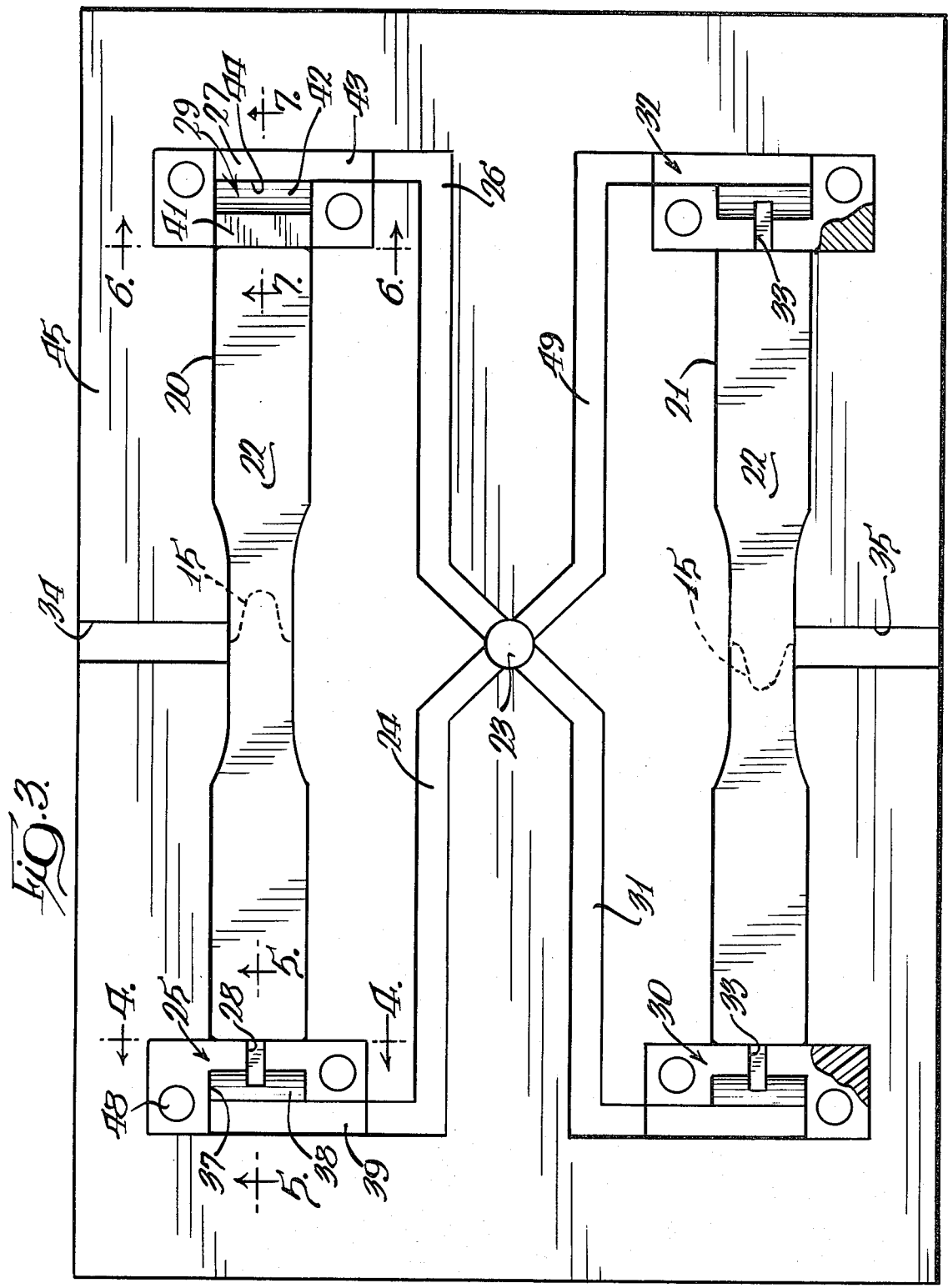

INJECTION MOLDING METHOD AND EQUIPMENT

BACKGROUND OF THE INVENTION

1. Field of the Invention

This invention relates to injection molding and in particular to injection molding wherein the molded element is formed by delivery of fluid synthetic resin to a cavity through a plurality of gates.

2. Description of the Background Art

A problem arises in the molding of a synthetic resin element from deliveries of the fluid resin through different gates to the mold cavity. More specifically, the joint formed by the leading surfaces of the several deliveries of fluid resin received through the different gates when they meet in the mold cavity is well known to be a potentially weak portion of the element. A number of attempted solutions to this problem have been made in the prior art while none has proven completely satisfactory.

More specifically, James S. Reid shows, in U.S. Pat. No. 2,182,389, a zone wherein the different streams of the resin meet in the cavity which is heated to render the leading edges of the streams more plastic at that zone.

Warren R. Tucker discloses, in U.S. Pat. No. 2,360,023, a similar structural concept.

Elmer L. Danielson et al., in U.S. Pat. No. 2,607,937, teaches a method of molding different parts sequentially and is not concerned with the problem of a heat weld joint.

A method of forming an annular plastic article by firstly filling a channel and then substantially simultaneously delivering the plastic from the channel into the annular mold is disclosed in U.S. Pat. No. 2,878,517 of Trevor K. Cramer.

In U.S. Pat. No. 3,051,994, Giorgio Carozzo shows an injection molded article wherein means are provided for causing a sharp demarcation line between two plastic sections of the molded article.

Another co-injection molding apparatus is illustrated in U.S. Pat. No. 3,061,879 of Ramon R. Montpeat.

Theodore G. Apostoleris et al., in U.S. Pat. No. 3,880,978, show a method for forming a plastic article wherein the mold design is arranged to prevent radial alignment of the welds from a single sprue.

I. Martin Spier shows, in U.S. Pat. No. 3,950,483, an injection molding process wherein dissimilar fluids intermixed at transitional zones provide the desired one-piece construction. The desired qualities are obtained by selecting dissimilar starting materials and molding an integrally cured and set article therefrom.

David O. Allen shows an injection molding method in U.S. Pat. No. 4,128,613 utilizing a gate having an irregular shape to avoid drooling, stringing, freeze-off or blockage problems.

Dwight M. Anderson shows a method and means for eliminating the weld line during thermoplastic molding in U.S. Pat. No. 2,191,703 by providing mold relief pockets adjacent the mold cavity portion wherein the weld line would otherwise form. Anderson teaches that by providing a choked or restricted portion of the mold cavity adjacent an overflow pocket, an improved surface on the article can be obtained.

SUMMARY OF THE INVENTION

The present invention comprehends an improved method of molding an element from synthetic resin including the steps of introducing synthetic resin into a cavity through a first gate, and introducing synthetic resin into the cavity through a second gate to flow through the cavity into abutment with the first resin from the first gate to define a joint therebetween, the resin in the second gate solidifying much sooner than the resin in the first gate to cause the leading surface of the resin from the first gate to project into a leading surface portion of the resin from the second gate during the mold packing operation to provide an enlarged weld line area and improved strength in the joint.

In one embodiment of the invention, the second gate has a higher thermal diffusivity than the first gate to cause a more rapid heat transfer to or from the resin injected through that second gate than the resin injected through the first gate.

Thermal diffusivity as used herein is defined as thermal conductivity divided by the volumetric heat capacity.

In the illustrated embodiment, a second resin is caused to flow, at least initially, in a direction directly opposite that of the flow of a first resin.

In one embodiment, the second gate is arranged to direct the flow of the resin through the gate into the cavity in a flow path defined by walls in the gate having a greater heat transfer area than that of the flow path of the resin received in the cavity through the first gate.

In one illustrated embodiment, the resin is first solidified in one of the gates to cause the desired flow pattern during the remainder of the packing stage.

The invention comprehends the provision of apparatus for effecting an improved method of forming a molded element.

In one embodiment, the gates are formed of different materials having different thermal diffusivity characteristics to cause the desired resin solidification rate differential.

In another embodiment, the gates are caused to have different geometric configurations to provide the desired resin solidification rate differential as a result of different rates of heat transfer caused by the different configurations.

In one illustrated embodiment, the first gate comprises a cylindrical gate and the second gate comprises a slit gate to provide the desired different heat transfer effect in the two gates.

The invention comprehends the provision of means for causing the resin delivery through a first gate to be terminated before delivery through a second gate to provide the desired temperature differential.

Thus, the method and apparatus of the present invention are extremely simple and economical while yet providing an improved high strength molded resin article.

BRIEF DESCRIPTION OF THE DRAWING

Other features and advantages of the invention will be apparent from the following description taken in connection with the accompanying drawing wherein:

FIG. 1 is a schematic view of a pair of gates of common geometry and common materials and a molded article in the cavity illustrating the formation of a weld line of planar form in forming a molded synthetic resin article by a conventional dual gate injection molding process and apparatus in accordance with the prior art;

FIG. 2 is a schematic diagram illustrating a pair of dissimilar geometry gates and the molding of such an article to have improved weld line strength as a result of utilization of the invention; mold apparatus details are not shown;

FIG. 3 is a plan view of a mold structure illustrating two different forms of molding apparatus embodying the invention;

FIG. 4 is a fragmentary vertical section taken substantially along the line 4—4 of FIG. 3;

FIG. 5 is a fragmentary vertical section taken substantially along the line 5—5 of FIG. 3;

FIG. 6 is a fragmentary vertical section taken substantially along the line 6—6 of FIG. 3;

FIG. 7 is a fragmentary section taken substantially along the line 7—7 of FIG. 3; and FIG. 8 is a schematic diagram illustrating multi-gate injection molding utilizing more than two dissimilar geometry gates and the molding of an article to have improved weld line strength at more than one location as a result of utilization of the invention; mold apparatus details are not shown.

DESCRIPTION OF THE PREFERRED EMBODIMENTS

As shown in FIG. 1 of the drawing, a molded element 10 may be formed of synthetic resin by injecting liquid resin into a mold cavity 11 through first and second gates 12 and 13, respectively (the walls forming cavity 11 have been omitted in FIG. 1). A typical injection molding cycle consists of:

1. A very rapid, low pressure mold filling stage. (approximately 1-2 secs)
2. A more lengthy, high pressure packing stage.
3. A cooling stage during which time the "in mold" pressure drops due to the fact that the resin portions in the gates have solidified.
4. Part ejection after sufficient mechanical strength is obtained.

For a 60-second molding cycle, synthetic resin is injected into the mold during the first 1-2 seconds to rapidly and completely fill the cavity. During this short initial time period very little heating or cooling of the synthetic resin takes place in the mold gates.

During the time period from about 2-40 seconds after the start of injection the synthetic resin is solidifying in the mold but the pressure is kept high. Flow into the mold cavity continues due to shrinkage of the solidifying part. This is the high pressure packing stage during which time period the synthetic resin may solidify in one gate structure of the mold much sooner than in another gate structure of the mold because of different heat transfer characteristics of the respective gate structures. For example, in a mold structure including a square gate structure, and a slit gate structure, solidification may be taking place in the slit gate after about 10 seconds of the pressure packing stage.

In the final portion of the cycle further cooling of the synthetic resin material occurs but with no more flow into the mold cavity.

In the prior art structure shown in FIG. 1, the two bodies of synthetic resin introduced into the mold cavity 11, through gates 12 and 13 meet at a weld line joint, or face, 14 which is relatively straight and substantially planar in form. It has been found that such a straight weld line joint usually represents a weak portion of the element 10 in that it is low in strength relative to forces perpendicular to the plane of the weld line.

The present invention comprehends an improved method and apparatus for effecting such multigate injection molding of synthetic resin elements wherein the weld face or joint 15 is caused to be relatively large in area and of non-planar form as a result of the resin material portion 16 delivered from gate 17 projecting into the resin material 18 delivered from gate 19.

As shown in FIG. 2, a molded element 22 may be formed of synthetic resin by injecting resin into a cavity through first and second gates 17 and 19, respectively. The two bodies of synthetic resin are thusly caused to flow, at least initially, in directions directly opposite from one another and to flow into abutment and meet at a weld line joint, or face, 15 of modified area and shape as will appear. When the bodies of synthetic resin from the respective gates flow into abutment and meet at a weld line or joint it will be appreciated that there may be changes in the flow direction of portions of the respective streams. Gate 17 defines a first geometric configuration differing from the second configuration of gate 19. The invention comprehends that the different geometric configurations be preselected to provide a different rate of heat transfer from the synthetic resin passing through the gate during the packing portion of the cycle. It has been found that by providing such a differential heat transfer rate for the portions of the resin material passing through the first gate 17 into the cavity, and the material passing through the second gate 19 into the cavity, the desired projection of the portion of the resin material identified with reference numeral 16 into the portion of the material identified with reference numeral 18 at the junction or weld face 15 results, thereby providing the desired improved increased area joint of non-planar form between the two bodies of synthetic resin. The improved strength joint 15 has a form approximating a cone with a rounded apex 15a and a rounded edge 15b about its periphery, and is increased in area over a planar joint such as that represented by weld line 14 of FIG. 1. It has been found that the production of the projecting interface between the two bodies of synthetic resin provides a substantial increase in the strength of the element at the weld face or joint 15 sometimes referred to in this art as the "weld line" or "knit line".

The invention further comprehends the causing of the temperature of the resin portion present in the gate 17 to be different from the temperature of the resin portion present in the gate 19 by causing cooling or heating the resin in one or the other of the gates by means not shown so as to cause the synthetic resin passing through the respective gates during the packing portion of the molding cycle to have different temperatures.

In the illustrated embodiment of FIG. 3, mold cavities 20 and 21 are provided for molding similar elements 22 of the type illustrated in FIG. 2. Synthetic resin is delivered to cavity 20 from a sprue gate 23. A first delivery runner 24 conducts the synthetic resin through a first gate structure 25 to the lefthand end of cavity 20 and a second runner 26 delivers resin from sprue gate 23 to a second gate structure 29 at the righthand end of cavity 20. Gate structure 25 includes a block which defines a square cross-section passage 28 through which liquid resin is passed into cavity 20. Gate structure 29 includes a block which defines a slit cross-section passage 41 extending fully across the gate structure 29. The slit cross-section passage 41 walls have a greater surface area than the square cross-section passage 28 walls. Thus respective gate structures include blocks providing wall means, defining the respective resin flow passages. However, the gate passages are shaped, dimensioned, and constructed such that the same pressure drop occurs therethrough. The slit gate structure 29 has a substantially greater ability to heat or cool the liquid resin, passing therethrough, depending on whether the resin is thermosetting or thermoplastic, than does square gate structure 25 because of the greater surface area of the resin passage walls, thereby causing the desired temperature differential in the resin delivered from the respective gates during packing, causing the resin in one gate to solidify first, producing the desired strength in the molded element 22 because of the extended relatively large area, non-planar weld face or knit line 15 illustrated in FIG. 2.

As shown in FIG. 3, another form of gate structure for molding the element 22 to have the desired extended weld face 15 may be utilized within the broad scope of the invention. Thus, as shown in the lower portion of FIG. 3, liquid synthetic resin is delivered into mold cavity 21 through a first gate structure 30 from a runner 31 connected to sprue gate 23, and through a second gate structure 32 from a runner 49 connected to the sprue gate 23. Each of the gate structures defines a similar square cross-section gate passage 33. However, gate structure 30 is formed of a material having a different thermal diffusivity from that of which gate structure 32 is formed, so that gate structure 30 has an ability to transfer heat from or to the synthetic resin at a different rate from that of gate structure 32. Where gate structure 30 is formed of a material having a higher thermal diffusivity than that of gate 32, gate structure 30 heats or cools the synthetic resin residing in the gate 30 during packing to a greater degree than the synthetic resin residing in gate structure 32.

As further illustrated in FIG. 3, mold cavity 20 is provided at its center with an air vent passage 34, and mold cavity is provided at its center with an air vent passage 35, permitting the incoming synthetic resin to flow unimpeded to the midportion wherein the desired weld line 15 is formed to provide the improved high strength synthetic resin element.

Similarly, mold cavity 11 of FIG. 1, and mold cavity 9 of FIG. 2 are provided with vent passages 11a and 9a.

The mold gate structures having the square cross-section delivery passages are illustrated in FIGS. 4 and 5. Thus, illustratively, as shown therein, gate structure 25 is defined by a block 36 fitted in a mold aperture 37 and having a square cross-section gate passage 28 extending from an inlet recess 38 opening to a runner passage 39, in turn connected to the main portion of the runner 24.

As discussed above, the construction of gate structures 30 and 32 is similar to the construction of gate structure 25 and, thus, the structure illustrated in FIGS. 4 and 5 is equally pertinent thereto. However, as further indicated above, gate structure 32 may be formed of a material having a different thermal diffusivity from that of gate structure 30 so as to provide the desired heat transfer differential for the two streams of synthetic resin delivered therethrough. Illustratively, in one embodiment, gate structure 30 was formed of copper and gate structure 32 was formed of steel. In another embodiment, gate structure 30 was formed of copper and gate structure 32 was formed of a phenolic resin.

An illustrative construction of gate structure 29 is shown in FIGS. 6 and 7. Thus, as shown therein, gate structure 29 is defined by a block 40 having an outlet portion defining a slit 41 extending across the block and opening to an inlet recess 42 communicating with a connecting runner 43, in turn connected to the runner 26 (see FIG. 3). The block is receivd in a mold aperture 44 disposed oppositely of mold aperture 37, as shown in FIG. 3.

As further illustrated in FIGS. 4-7, the gate apertures are provided in a bottom mold section 45, as are the cavities, runners, sprue and air vents, as illustrated in FIG. 3. The top mold section 46, as shown in FIGS. 4-7, defines a planar lower surface upwardly closing the gate apertures, cavities, sprues and vent passages.

Each of the gates may be secured in the respective apertures by suitable set screws 48 (FIG. 3).

The present invention is not limited to two-gate mold structures but may be utilized in structures employing three or more gates, resulting in two or more weld lines of the desired strength in the molded article. Referring now to FIG. 8, the multigated injection molding structure shown therein includes a first gate structure 50 having a square cross-section gate passage 51, a second gate structure 52 having a square cross-section gate passage 53, and a third gate structure 54 having a slit cross-section passage 55. The gate structures 50, 52 and 54, although of different cross-sectional configurations, may all be of the same material, for example, steel. A pair of air vent passages 56 and 57 are provided to vent the mold cavity 58, permitting the incoming synthetic resin to flow unimpeded into all parts of the mold cavity. During the molding cycle synthetic resin injected through slit gate passage 55 will begin to solidify during the mold packing portion of the cycle before synthetic resin injected into the mold cavity 58 through square cross-section gate passages 51 and 53, resulting in relatively large area non-planar weld lines 60 and 61 in the molded article 62, providing a desirable impact strength characteristic for the molded article.

Other methods and apparatus may be used in carrying out the invention including means for closing one of the gates before the other and the use of a valve means such as a mechanical valve to restrict the flow through one of the gates.

It has been found that a substantial increase in the impact strength of the molded element is obtained by utilizing gates having the different gate passage configurations of gates 28 and 41. Where the gates have similar dynamic pressure drops but are formed of materials having different thermal diffusivities, improvement in the tensile impact strength is obtained. Thus, illustratively the impact strength for a number of different materials and a number of different gate structures is shown in the following table:

| IDENTIFICATION OF MATERIAL | GATE CONFIGURATION | | TENSILE IMPACT STRENGTH kJ/m² | | |
|---|---|---|---|---|---|
| | #1 | #2 | 21° C. | 4° C. | −18° C. |
| Impact Modified Polypropylene | Square, Steel | Square, Steel | 31 | 26 | 31 |
| | Square, Steel | Slit, Steel | 111 | 64 | 48 |
| | Square, Copper | Square, Phenolic | 51 | 36 | 38 |
| Talc | Square, | Square, | 8 | 6 | 6 |

-continued

| IDENTIFI-CATION OF MATERIAL | GATE CONFIGURATION #1 | GATE CONFIGURATION #2 | TENSILE IMPACT STRENGTH kJ/m² 21° C. | 4° C. | −18° C. |
|---|---|---|---|---|---|
| Filled Polypropylene | Steel Square, Steel | Steel Slit, Steel | 23 | 16 | 14 |
| | Square, Copper | Square, Phenolic | 12 | 12 | 6 |
| CaCO₃ Filled Polypropylene | Square, Steel | Square, Steel | 10 | 7 | 6 |
| | Square, Steel | Slit, Steel | 16 | 12 | 6 |
| Polycarbonate | Square, Steel | Square, Steel | 561 | 512 | 660 |
| | Square, Steel | Slit, Steel | 602 | 595 | 667 |
| ABS/Polycarbonate Blend | Square, Steel | Square, Steel | 29 | 27 | 23 |
| | Square, Steel | Slit, Steel | 88 | 34 | 34 |
| ABS | Square, Steel | Square, Steel | 44 | 48 | 53 |
| | Square, Steel | Slit, Steel | 58 | 66 | 79 |
| Impact Modified PVC | Square, Steel | Square, Steel | 47 | 38 | 32 |
| | Square, Steel | Slit, Steel | 69 | 45 | 40 |
| Polystyrene | Square, Steel | Square, Steel | 8 | 7 | 4 |
| | Square, Steel | Slit, Steel | 25 | 22 | 13 |
| Impact Polystyrene | Square, Steel | Square, Steel | 30 | 27 | 34 |
| | Square, Steel | Slit, Steel | 28 | 28 | 38 |
| Thermoset Polyester | Square, Steel | Square, Steel | 9 | — | — |
| | Square, Steel | Slit, Steel | 19 | — | — |

Thus, the present invention comprehends an improved injection molding method and apparatus wherein the weld lines or faces resulting in the forming of a synthetic resin element in a multigated mold are caused to be located in the same general location as where the gates therein are of similar construction. However, the invention comprehends changing the heat transfer characteristics of the respective gates so as to cause an elongation of the weld line or enlargement of the area of the weld face into a non-planar shape by the projection of a resin from one gate into the resin delivered from the other gate.

The invention comprehends providing such an improved high strength molded element wherein the improvement in the strength characteristics occurs over a range of temperatures, such as illustrated in the table set forth above. Thus, the invention is advantageously adapted for use in molding plastic parts for use in refrigeration apparatuses, such as freezers and refrigerators.

The test results set forth above relate to polypropylene, polycarbonate, acrylonitrile-butadiene-styrene (ABS), ABS/polycarbonate blend, impact modified polyvinyl chloride (PVC), polystyrene, impact polystyrene and thermoset polyester. However, the invention is not limited to these materials and may be advantageously employed for injection molding of other plastic materials including thermoplastics such as polyethylene and acrylics, and thermosetting resins such as polyurethane and epoxies.

As will be obvious to those skilled in the art, other material combinations providing the highly desirable temperature differential, other gate geometries and cross-section configurations providing the desirable heat transfer differential, and other arrangements to provide the desired modification of heat transfer to the resin in the gate may be employed within the scope of the invention.

The foregoing disclosure of specific embodiments is illustrative of the broad inventive concepts comprehended by the invention.

We claim:

1. The method of molding an element from synthetic resin comprising the steps of:
   injecting fluid synthetic resin through a first gate into a mold cavity to fill the mold, while concurrently injecting fluid synthetic resin at substantially the same temperature as that of the resin being injected through said first gate through a second gate into said mold cavity to fill the mold;
   transferring heat from the resin passing through the respective gates at different rates such that the resin received in the mold cavity through the second gate solidifies in the second gate sooner than the resin received in the mold cavity through the first gate, the resin streams from the respective gates flowing through the mold cavity into abutment with each other to define a joint therebetween;
   packing the resin in the mold cavity by application of pressure to the resin in the mold cavity, the different solidification rates of the resins received through the respective gates being sufficient to cause a leading surface portion of the resin received through said first gate to project substantially into a leading surface portion of the resin received through said second gate during said mold packing step to provide a non-planar, relatively large area joint therebetween having substantial strength after the element is cooled;
   cooling the element; and
   removing the element from the mold.

2. The method of molding an element of claim 1 wherein the different solidification rates of the resins received through the respective gates causes solidification in said second gate of resin received through said second gate while injection of resin through said first gate into the mold cavity continues.

3. The method of molding an element of claim 1 wherein the different solidification rates of the resins received through the respective gates causes solidification in said second gate of resin received through said second gate while injection of resin through said first gate into the mold cavity continues, said injection step having a duration of from 1 to 2 seconds, and said packing step having a duration of from 2 to 40 seconds.

4. The method of molding an element of claim 1 wherein the different solidification rates of the resins received through the respective gates causes solidification in said second gate of resin received through said second gate while injection of resin through said first gate into the mold cavity continues, said packing step being effected at a higher pressure than the pressure applied during the injecting step.

5. The method of molding an element of claim 1 wherein the second gate is arranged to direct the flow of the resin into said cavity through a passage defined by walls having a greater heat transfer area than the walls defining the flow path of the resin received through said first gate.

6. The method of molding an element of claim 1 wherein said resin is cooled at said second gate during packing of the resin in the cavity to cause the temperature of said resin received through said second gate to be lower than that of said resin received through said first gate.

7. The method of molding an element of claim 1 wherein said resin is a thermosetting resin and the resin is heated more rapidly at said second gate than at said first gate during packing of the resin in the cavity to cause the resin received through said second gate to solidify before the resin received through said first gate.

8. The method of molding an element of claim 1 wherein said step of injecting fluid synthetic resin concurrently through said first and second gates includes injecting fluid synthetic resin concurrently through a third gate into said mold cavity, and the resin streams passing through the respective gates meet between each adjacent pair of gates to define a joint therebetween.

9. The method of molding an article from synthetic resin comprising the steps of:

injecting hot fluid synthetic resin through a first gate into a mold cavity to fill the mold, while concurrently injecting fluid synthetic resin through a second gate at substantially the same temperature as that of the resin being injected through said first gate into said mold cavity to fill the mold;

causing the resin to pass through the respective gates at different rates such that the resin received in the mold cavity through the second gate solidifies in the second gate sooner than the resin received in the mold cavity through the first gate, the resin streams from the respective gates flowing through the mold cavity into abutment with each other to define a joint therebetween;

packing the resin in the mold cavity by application of pressure to the resin in the mold cavity, the different solidification rates of the resins received through the respective gates being sufficient to cause a leading surface portion of the resin received through said first gate to project substantially into a leading surface portion of the resin received through said second gate during said mold packing step to provide a non-planar, relatively large area joint therebetween having substantial strength after the article is cooled;

cooling the article; and removing the article from the mold.

* * * * *

UNITED STATES PATENT AND TRADEMARK OFFICE
CERTIFICATE OF CORRECTION

PATENT NO. : 4,399,093
DATED : August 16, 1983
INVENTOR(S) : DAVID B. KIRBY and OTFRIED W. G. HEYBEY It is certified that error appears in the above-identified patent and that said Letters Patent is hereby corrected as shown below:

Correct the title to read --Injection Molding Method and Apparatus--.

Claim 8, line 3 (col. 9, line 17) before "secong" insert --said--.

Signed and Sealed this

Fourteenth Day of August 1984

[SEAL]

Attest:

GERALD J. MOSSINGHOFF

Attesting Officer

Commissioner of Patents and Trademarks